United States Patent
Imanaka et al.

(10) Patent No.: US 11,322,310 B2
(45) Date of Patent: May 3, 2022

(54) METHOD FOR PRODUCING PHOTOCHEMICAL ELECTRODE

(71) Applicant: FUJITSU LIMITED, Kawasaki (JP)

(72) Inventors: Yoshihiko Imanaka, Atsugi (JP); Hideyuki Amada, Atsugi (JP); Toshio Manabe, Atsugi (JP); Toshihisa Anazawa, Sagamihara (JP); Sachio Ido, Yamato (JP); Naoki Awaji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/902,404

(22) Filed: Jun. 16, 2020

(65) Prior Publication Data
US 2020/0312575 A1    Oct. 1, 2020

Related U.S. Application Data

(62) Division of application No. 15/487,504, filed on Apr. 14, 2017, now abandoned.

(30) Foreign Application Priority Data

Apr. 28, 2016    (JP) ................ 2016-091277

(51) Int. Cl.
*H01G 9/20*    (2006.01)

(52) U.S. Cl.
CPC ........... *H01G 9/2009* (2013.01); *H01G 9/204* (2013.01); *H01G 9/205* (2013.01); *H01G 9/2027* (2013.01); *Y02E 60/36* (2013.01)

(58) Field of Classification Search
CPC ...... H01G 9/2009; H01G 9/204; H01G 9/205; H02G 9/2027
USPC ....................................................... 136/262
See application file for complete search history.

(56) References Cited

U.S. PATENT DOCUMENTS

| | | | |
|---|---|---|---|
| 2010/0155738 A1* | 6/2010 | Nabeta | H01L 33/42 257/76 |
| 2012/0028141 A1 | 2/2012 | Nomura et al. | |
| 2013/0315787 A1* | 11/2013 | Dukovic | B01J 35/004 422/162 |

FOREIGN PATENT DOCUMENTS

| | | |
|---|---|---|
| JP | 2015-200016 A | 11/2015 |
| WO | 2006/082801 A1 | 8/2006 |
| WO | 2011/016244 A1 | 2/2011 |

OTHER PUBLICATIONS

Imanaka et al., "Nanoparticulated Dense and Stress-Free Ceramic Thick Film for Material Integration", Advanced Engineering Materials 2013, 15, No. 11, pp. 1129-1135 (7 pages).

(Continued)

*Primary Examiner* — Shannon M Gardner (74) *Attorney, Agent, or Firm* — Fujitsu Patent Center (57) ABSTRACT

A photochemical electrode includes: an electrically conductive layer; and a photoexcitation material layer provided over the electrically conductive layer and including a photoexcitation material, wherein the photoexcitation material layer is one of a first photoexcitation material layer in which a potential of the conduction band minimum decreases from a second surface opposite to a first surface on the side of the electrically conductive layer toward the first surface and a second photoexcitation material layer in which a potential of the valence band maximum decreases from the second surface toward the first surface.

5 Claims, 4 Drawing Sheets

(56) References Cited

OTHER PUBLICATIONS

JPOA—Office Action of Japanese Patent Application No. 2016-091277 dated Nov. 26, 2019 with Machine Translation.
USPTO, (Gardner) Non-Final Rejection, Apr. 17, 2020, in parent U.S. Appl. No. 15/487,504 [pending].
USPTO, (Gardner) Final Rejection, Jan. 17, 2020, in parent U.S. Appl. No. 15/487,504 [pending].
USPTO, (Gardner) Non-Final Rejection, Nov. 1, 2019, in parent U.S. Appl. No. 15/487,504 [pending].
USPTO, (Gardner) Non-Final Rejection, Apr. 19, 2019, in parent U.S. Appl. No. 15/487,504 [pending].
USPTO, (Gardner) Requirement for Restriction/Election, Nov. 2, 2018, in parent U.S. Appl. No. 15/487,504 [pending].

* cited by examiner

METHOD FOR PRODUCING PHOTOCHEMICAL ELECTRODE

CROSS-REFERENCE TO RELATED APPLICATION

This application is a divisional of application Ser. No. 15/487,504, filed Apr. 14, 2017, which is based upon and claims the benefit of priority of the prior Japanese Patent Application No. 2016-091277, filed on Apr. 28, 2016, the entire contents of which are incorporated herein by reference.

FIELD

The embodiments discussed herein are related to a photochemical electrode and a method for producing the photochemical electrode.

BACKGROUND

Clean energy creation techniques emitting no carbon $CO_2$ are attracting attention because of global environmental issues and energy issues.

Japanese Laid-open Patent Publication No. 2015-200016 discloses a related technique.

SUMMARY

According to an aspect of the embodiments, a photochemical electrode includes: an electrically conductive layer; and a photoexcitation material layer provided over the electrically conductive layer and including a photoexcitation material, wherein the photoexcitation material layer is one of a first photoexcitation material layer in which a potential of the conduction band minimum decreases from a second surface opposite to a first surface on the side of the electrically conductive layer toward the first surface and a second photoexcitation material layer in which a potential of the valence band maximum decreases from the second surface toward the first surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 38 illustrates an example of the change in each of the conduction band minimum and valence band maximum of the photochemical electrode illustrated in FIG. 3A;

DESCRIPTION OF EMBODIMENTS

For example, in an artificial photosynthesis technique included in clean energy creation techniques, electrons generated from an optical semiconductor material (anode electrode) are allowed to react with protons in water, whereby hydrogen is produced. In the case where $CO_2$ is dissolved in water, organic compounds, such as formic acid, formaldehyde, methane, and methanol, serving as energy sources are produced from reactions of electrons, protons, and $CO_2$.

In an artificial photosynthesis system, for example, an anode electrode and cathode electrode placed in water are electrically connected through a conductor. A photocatalytic semiconductor material (a semiconductor material which can be excited by visible light and which has a small band gap) formed on the anode electrode is irradiated with sunlight, charge-hole separation is carried out, and excited electrons are transferred through a conducting wire. Therefore, protons react with electrons on the cathode electrode to produce hydrogen.

In the artificial photosynthesis system, for example, when the photocatalytic semiconductor material formed on the anode electrode is irradiated with sunlight, formed electrons may possibly recombine with holes. Therefore, the amount of charge used for a hydrogen production reaction is reduced and high photocurrent for hydrogen production may possibly not be obtained.

A photochemical electrode includes at least an electrically conductive layer and a photoexcitation material layer and may further include another member as desired.

The photoexcitation material layer contains a photoexcitation material.

The photoexcitation material layer satisfies at least one of Condition (A) and Condition (B) below.

Condition (A): The potential of the conduction band minimum decreases from a surface opposite to a surface on the electrically conductive layer side toward the surface on the electrically conductive layer side.

Condition (B): The potential of the valence band maximum decreases from the surface opposite to the surface on the electrically conductive layer side toward the surface on the electrically conductive layer side.

In the artificial photosynthesis system, when the photocatalytic semiconductor material formed on the anode electrode is irradiated with sunlight, formed electrons may possibly recombine with holes. Therefore, the amount of charge used for a hydrogen production reaction is reduced and high photocurrent for hydrogen production may possibly not be obtained.

For example, in order to separate electrons and holes generated in the photoexcitation material, in the photoexcitation material layer of the photochemical electrode, the energy level of the conduction band or valence band in a band structure has a gradient. For example, in the photochemical electrode, the photoexcitation material layer satisfies at least one of Condition (A) and Condition (B). Electrons are likely to move toward the electrically conductive layer side, which has low potential, depending on the band gradient due to Condition (A). On the other hand, holes are likely to move toward the side (for example, the water side) opposite to the electrically conductive layer side, which has low potential, depending on the band gradient due to Condition (B) and react with water to produce oxygen. Therefore, the electrons and holes formed by photoexcitation are unlikely to recombine with each other and are transferred to respective reaction systems. As a result, a high photocurrent may possibly be obtained.

Figure 1:
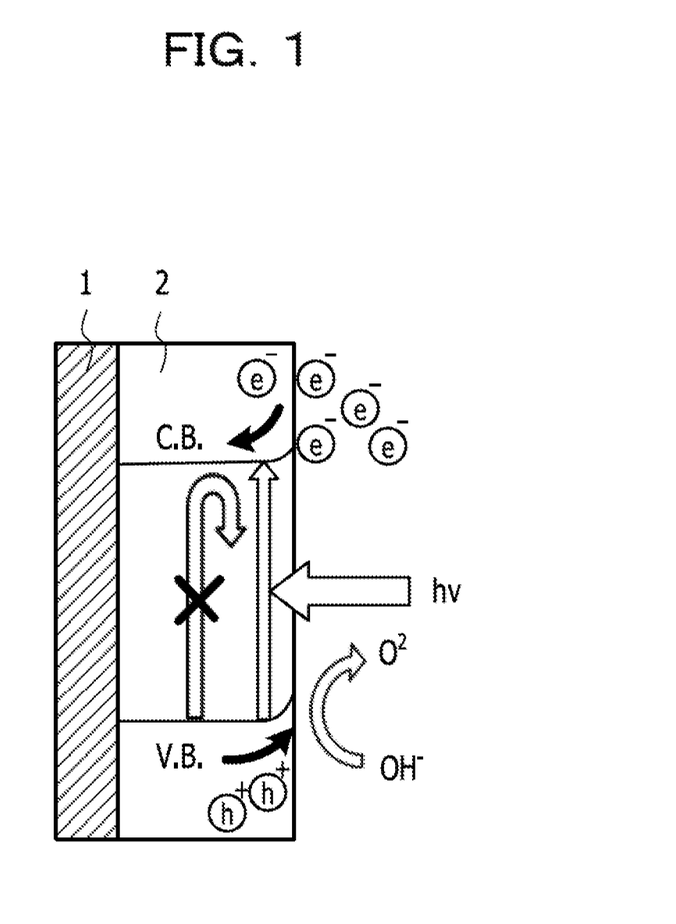
FIG. 1 illustrates an example of a photochemical electrode.

FIG. 1 illustrates an example of the photochemical electrode. The photochemical electrode in FIG. 1 includes an electrically conductive layer 1 and a photoexcitation material layer 2. In the photoexcitation material layer 2, Condition (A) and Condition (B) are satisfied. For example, the conduction band (C.B.) minimum lowers from a surface opposite to a surface on the electrically conductive layer 1 side toward the surface on the electrically conductive layer 1 side. The valence band (V.B) maximum lowers from the surface opposite to the surface on the electrically conductive layer 1 side toward the surface on the electrically conductive layer 1 side. Therefore, electrons generated in the photoexcitation material in the photoexcitation material layer 2 by light irradiation (hv) move toward the electrically conductive layer 1 side, which has low potential, depending on the band gradient due to Condition (A). On the other hand, holes generated in the photoexcitation material in the photoexcitation material layer 2 by light irradiation (hv) move toward the side (for example, the water side) opposite to the electrically conductive layer 1 side, which has low potential, depending on the band gradient due to Condition (B) and react with water ($OH^-$ in FIG. 1) to produce oxygen. Therefore, the electrons and holes formed by photoexcitation are unlikely to recombine with each other and are transferred to respective reaction systems. As a result, a high photocurrent may possibly be obtained.

The electrically conductive layer 1 may be a layer with electrical conductivity. A material, the shape, the size, and the structure of the electrically conductive layer 1 are not particularly limited and may be appropriately selected depending on purposes. The material of the electrically conductive layer 1 is, for example, a metal, a metal oxide, or the like. Examples of the metal include silver (Ag), gold (Au), copper (Cu), platinum (Pt), palladium (Pd), tungsten (W), nickel (Ni), tantalum (Ta), bismuth (Bi), lead (Pb), indium (In), tin (Sn), zinc (Zn), titanium (Ti), and aluminium (Al). Examples of the metal oxide include indium-doped tin oxide (ITO), fluorine-doped tin oxide (FTO), antimony-doped tin oxide (ATO), zinc oxide, indium oxide ($In_2O_3$), aluminium-doped zinc oxide (AZO), gallium-doped zinc oxide (GZO), tin oxide, zinc oxide-tin oxide systems, indium oxide-tin oxide systems, and zinc oxide-indium oxide-magnesium oxide systems.

When the electrically conductive layer 1 is a thin film, the electrically conductive layer 1 may be supported with a support. The support is, for example, a glass plate or the like.

The photoexcitation material layer 2 contains the photoexcitation material. The photoexcitation material layer 2 satisfies at least one of Condition (A) and Condition (B). The term "photoexcitation material" refers to a material excited by absorbing light.

Figure 2:
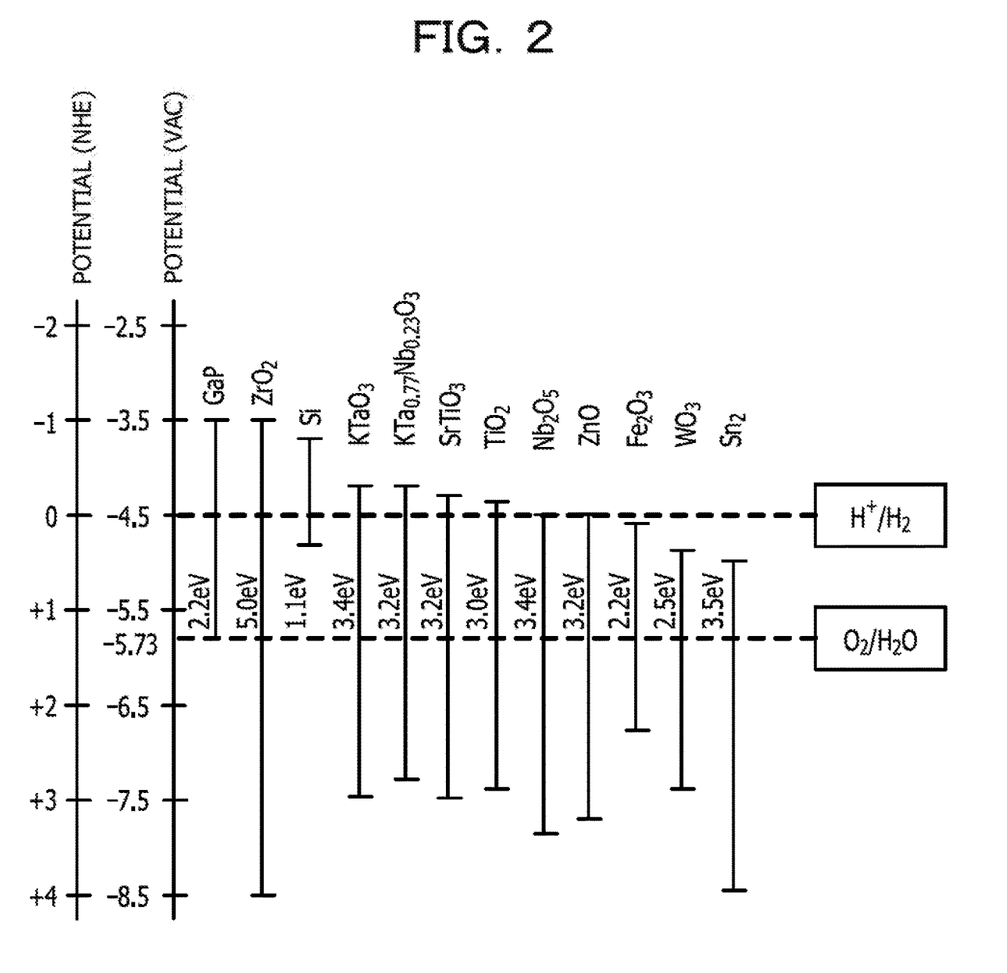
FIG. 2 illustrates an example of the band structure of a photoexcitation material.

Each of Condition (A) and Condition (B) is satisfied by the fact that, for example, the photoexcitation material layer 2 has a multilayer structure and layers contain photoexcitation materials having different band structures. FIG. 2 illustrates an example of the band structure of each photoexcitation material. The photoexcitation material may have such a band structure as illustrated in FIG. 2. For example, these photoexcitation materials are appropriately selected and the photoexcitation material layer 2 is prepared by stacking layers containing these photoexcitation materials, whereby the photoexcitation material layer 2, which satisfies at least one of Condition (A) and Condition (B), is obtained. For example, −5.73 eV (vs VAC) represents the oxidation-reduction potential of $O_2/H_2O$ at the vacuum level. For example, −4.5 eV (vs VAC) represents the oxidation-reduction potential of $H^+/H_2$ at the vacuum level.

The photoexcitation material layer 2 has a multilayer structure including a plurality of layers. When the multilayer structure satisfies at least one of Condition (A-1) and Condition (B-1) below, the photoexcitation material layer 2 may possibly be readily prepared.

Condition (A-1): The potential of the conduction band minimum decreases stepwise from the surface opposite to the surface on the electrically conductive layer 1 side toward the surface on the electrically conductive layer 1 side.

Condition (B-1). The potential of the valence band maximum decreases stepwise from the surface opposite to the surface on the electrically conductive layer 1 side toward the surface on the electrically conductive layer 1 side.

A method for preparing the photoexcitation material layer 2 is not particularly limited and may be appropriately selected depending on purposes. For example, when the photoexcitation material layer 2 has the multilayer structure, each layer may be prepared using a photoexcitation material contained in the layer by a physical vapor deposition process, a chemical vapor deposition process, or the like. When the photoexcitation material is powder, each layer may be prepared by an aerosol-type nanoparticle deposition (NPD) process. The aerosol-type nanoparticle deposition (NPD) process is not particularly limited and may be selected depending on purposes. For example, a process described in a literature (ADVANCED ENGINEERING MATERIALS, 2013, 15, No. 11, 1129-1135) may be selected.

The photoexcitation material is not particularly limited and may be appropriately selected depending on purposes. For example, an oxide, a nitride, a carbide, a sulfide, a group III-V compound semiconductor, a group II-VI compound semiconductor, and the like may be selected. These compounds may be used alone or in combination.

When the photoexcitation material layer 2 has the multilayer structure, which includes a plurality of the layers, at least one of a plurality of the layers may contain a photoexcitation material of a solid solution. The photoexcitation material of the solid solution may be a solid solution of MN (M is at least one of Ga, Al, and In) and ZnO. Examples of such a solid solution include a gallium nitride-zinc oxide solid solution, an aluminium nitride-zinc oxide solid solution, and an indium nitride-zinc oxide solid solution. Ga, Al, and In share the commonality that Ga, Al, and In are group 13 elements.

The content of ZnO in the solid solution is preferably 30 mole percent or more for a reason below. The band gap of the solid solution is small and the level of the conduction band minimum is greater than the standard hydrogen potential, 0, and is less than 1.

In the photoexcitation material layer 2, the oxidation-reduction potential of $H^+/H_2$ and the oxidation-reduction potential of $O_2/H_2O$ may be present between the valence band maximum and the conduction band minimum in the surface opposite to the surface on the electrically conductive layer 1 side. Therefore, the oxidative decomposition of water may be carried out only with the photochemical electrode.

The average thickness of the photoexcitation material layer 2 is not particularly limited, may be set depending on purposes, and may be, for example, 1 μm to 10 μm. When the photoexcitation material layer 2 has the multilayer structure, which includes a plurality of the layers, the average thickness of each layer may be, for example, 0.5 μm to 2 μm.

Figure 3A:
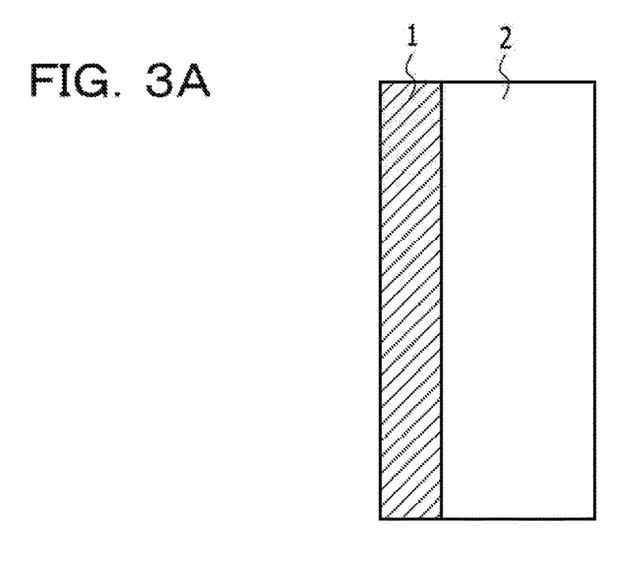
FIG. 3A illustrates an example of a cross section of a photochemical electrode.
Figure 3B:
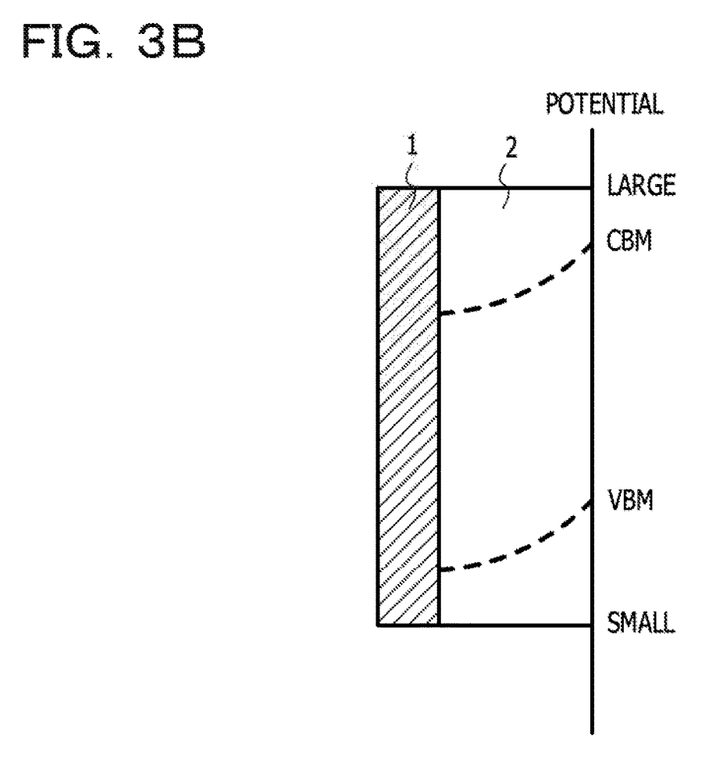

FIG. 3A illustrates an example of a cross section of a photochemical electrode. FIG. 3B illustrates an example of the change in each of the conduction band minimum (CBM) and valence band maximum (VBM) of the photochemical electrode illustrated in FIG. 3A. The photochemical electrode illustrated in FIGS. 3A and 3B includes an electrically conductive layer 1 and a photoexcitation material layer 2. The photoexcitation material layer 2 contains a photoexcitation material. As drawn with a dashed line in FIG. 3B, in the photoexcitation material layer 2, the potential of the conduction band minimum (CBM) decreases continuously from a surface opposite to a surface on the electrically conductive layer 1 side toward the surface on the electrically conductive layer 1 side. As drawn with a dashed line in FIG. 3B, in the photoexcitation material layer 2, the potential of the valence band maximum (VBM) decreases continuously from the surface opposite to the surface on the electrically conductive layer 1 side toward the surface on the electrically conductive layer 1 side.

Figure 4A:
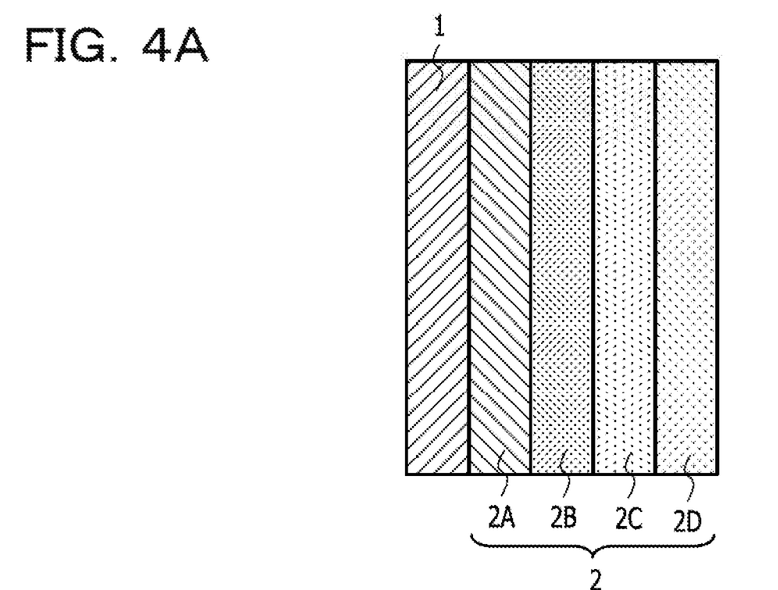
FIG. 4A illustrates an example of a cross section of a photochemical electrode.
Figure 4B:
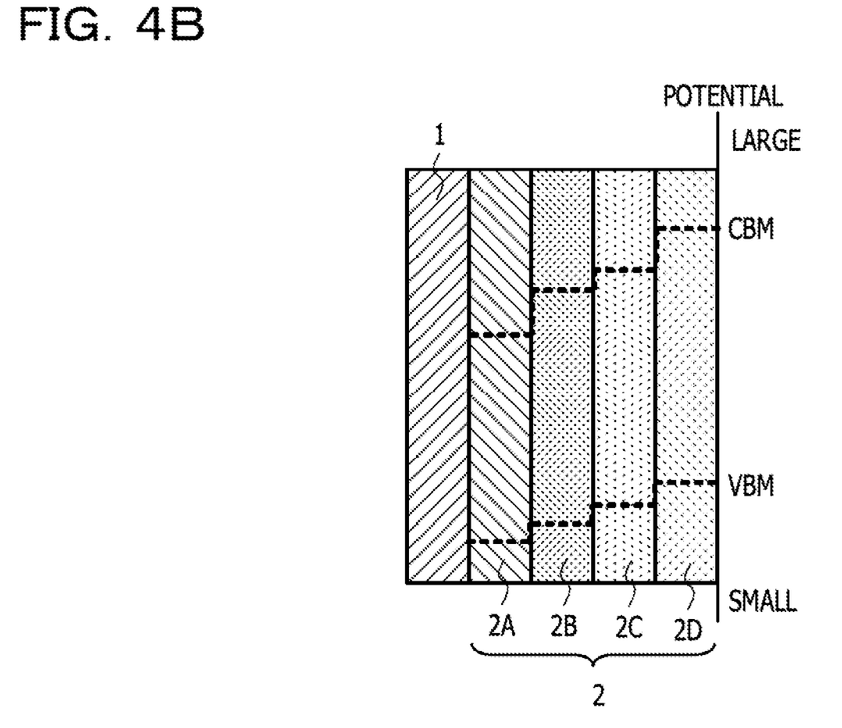
FIG. 4B illustrates an example of the change in each of the conduction band minimum and valence band maximum of the photochemical electrode illustrated in FIG. 4A.

FIG. 4A illustrates an example of a cross section of a photochemical electrode. FIG. 4B illustrates an example of the change in each of the conduction band minimum (CBM) and valence band maximum (VBM) of the photochemical electrode illustrated in FIG. 4A. The photochemical electrode illustrated in FIGS. 4A and 4B includes an electrically conductive layer 1 and a photoexcitation material layer 2. The photoexcitation material layer 2 has a multilayer structure in which four layers (2A, 2B, 2C, and 2D) are stacked. The four layers contain different photoexcitation materials. In the photoexcitation material layer 2, the four layers are placed so as to satisfy Condition (A-1) and Condition (B-1). Therefore, as drawn with a dashed line in FIG. 4B, in the photoexcitation material layer 2, the potential of the conduction band minimum (CBM) decreases stepwise from a surface opposite to a surface on the electrically conductive layer 1 side toward the surface on the electrically conductive layer 1 side. As drawn with a dashed line in FIG. 4B, in the photoexcitation material layer 2, the potential of the valence band maximum (VBM) decreases stepwise from the surface opposite to the surface on the electrically conductive layer 1 side toward the surface on the electrically conductive layer 1 side.

The photochemical electrode is useful as an anode electrode used for an anode of a carbon dioxide reduction apparatus for carrying out artificial photosynthesis. The carbon dioxide reduction apparatus may include the photochemical electrode, which is an anode electrode; a proton-permeable membrane; and a cathode electrode in that order. The carbon dioxide reduction apparatus may further include another member as desired.

Photoexcitation materials below may be used.

ZnO (100) powder: zinc oxide with an average particle size of 500 nm $WO_3$ (100) powder: tungsten oxide with an average particle size of 500 nm $TiO_2$ (100) powder: anatase titanium oxide with an average particle size of 500 nm $SrTiO_3$ (100) powder: strontium titanate with an average particle size of 500 nm For example, a photoexcitation material is prepared. The photoexcitation material may be prepared by a known method. In photoexcitation materials below, the value in parentheses indicates the molar ratio. For example, a GaN (60)-ZnO (40) solid solution is a solid solution with a GaN-to-ZnO molar ratio (GaN:ZnO) of 60:40.

GaN (60)-ZnO (40) solid solution (an average particle size of 500 nm)

GaN (50)-ZnO (50) solid solution (an average particle size of 500 nm)

GaN (40)-ZnO (60) solid solution (an average particle size of 500 nm)

GaN (30)-ZnO (70) solid solution (an average particle size of 500 nm)

GaN (20)-ZnO (80) solid solution (an average particle size of 500 nm)

These photoexcitation materials are prepared in such a manner that $Ga_2O_3$ particles and ZnO particles are mixed together such that the molar ratio of GaN to ZnO in an obtained solid solution is a predetermined molar ratio, followed by heat treatment in a nitrogen atmosphere or an ammonia atmosphere. For example, the GaN (60)-ZnO (40) solid solution is prepared in such a manner that the $Ga_2O_3$ particles and the ZnO particles are mixed together such that the molar ratio (GaN:ZnO) of GaN to ZnO in an obtained solid solution is 60:40, followed by heat treatment at 750° C. for 5 hours in a nitrogen atmosphere or an ammonia atmosphere.

The potential of the CBM (conduction band minimum) of each photoexcitation material and the potential of the VBM (valence band maximum) thereof are indicated in Tables 1-1 and 1-2. The potential of the CBM and the potential of the VBM in Tables 1-1 and 1-2 are potentials (eV) at the vacuum level. The same applies to Tables 2 to 8. These may be calculated by a method of calculation from the vacuum level determined by X-ray photoelectron spectroscopy (XPS) and the band gap determined with a spectrometer or a method of calculation from the level determined from a Mott-Schottky plot and the band gap determined with a spectrometer.

TABLE 1-1

| Photoexcitation material | GaN (60)-ZnO (40) solid solution | GaN (50)-ZnO (50) solid solution | GaN (40)-ZnO (60) solid solution | GaN (30)-ZnO (70) solid solution | GaN (20)-ZnO (80) solid solution |
|---|---|---|---|---|---|
| CBM (eV) | 0.30 | 0.25 | 0.20 | 0.15 | 0.12 |
| VBM (eV) | −1.60 | −1.80 | −2.00 | −2.30 | −2.50 |

TABLE 1-2

| Photoexcitation material | ZnO (100) | $WO_3$ (100) | $TiO_2$ (100) | $SrTiO_3$ (100) |
|---|---|---|---|---|
| CBM (eV) | 0.10 | −0.20 | 0.20 | 0.29 |
| VBM (eV) | −3.50 | −3.00 | −3.00 | −3.20 |

For example, glass provided with an FTO (fluorine-doped tin oxide) thin film is used as a first example. The ZnO (100) powder is sprayed on the FTO thin film by an aerosol-type nanoparticle deposition (NPD) process, whereby a thin film (first layer) with an average thickness of 1 μm is formed. The GaN (20)-ZnO (80) solid solution is sprayed on the formed thin film (first layer) by the aerosol-type nanoparticle deposition (NPD) process, whereby a thin film (second layer) with an average thickness of 1 μm is formed. The GaN (40)-ZnO (60) solid solution is sprayed on the formed thin film (second layer) by the aerosol-type nanoparticle deposition (NPD) process, whereby a thin film (third layer) with an average thickness of 1 µm is formed. The GaN (50)-ZnO (50) solid solution is sprayed on the formed thin film (third layer) by the aerosol-type nanoparticle deposition (NPD) process, whereby a thin film (fourth layer) with an average thickness of 1 µm is formed. The GaN (60)-ZnO (40) solid solution is sprayed on the formed thin film (fourth layer) by the aerosol-type nanoparticle deposition (NPD) process, whereby a thin film (fifth layer) with an average thickness of 1 µm is formed, Subsequently, annealing is performed at 600° C. for 30 minutes in a nitrogen atmosphere. As above, a photochemical electrode is obtained. The aerosol-type nanoparticle deposition (NPD) process follows a process described in a literature (ADVANCED ENGINEERING MATERIALS, 2013, 15, No. 11, 1129-1135).

The configuration of a photoexcitation material layer in the obtained photochemical electrode, the potential of the CBM of each layer of the photoexcitation material layer, and the potential of the VBM thereof are indicated in Table 2.

chemical electrode is obtained. The aerosol-type nanoparticle deposition (NPD) process may be the same as the above-mentioned aerosol-type nanoparticle deposition (NPD) process.

The obtained photochemical electrode, as well as the first example, is measured for photocurrent. As a result, 0.1 mA/cm$^2$ is obtained at a bias voltage of 1 V.

For example, glass provided with an FTO (fluorine-doped tin oxide) thin film is used as a fourth example. The ZnO (100) powder is sprayed on the FTO thin film by an aerosol-type nanoparticle deposition (NPD) process, whereby a thin film (first layer) with an average thickness of 1 µm is formed. The GaN (20)-ZnO (80) solid solution is sprayed on the formed thin film (first layer) by the aerosol-type nanoparticle deposition (NPD) process, whereby a thin film (second layer) with an average thickness of 1 µm is formed. The GaN (30)-ZnO (70) solid solution is sprayed on the formed thin film (second layer) by the aerosol-type

TABLE 2

| Photoexcitation material | First layer ZnO (100) | Second layer GaN (20)-ZnO (80) solid solution | Third layer GaN (40)-ZnO (60) solid solution | Fourth layer GaN (50)-ZnO(50) solid solution | Fifth layer GaN (60)-ZnO (40) solid solution |
|---|---|---|---|---|---|
| CBM (eV) | 0.10 | 0.12 | 0.20 | 0.25 | 0.30 |
| VBM (eV) | −3.50 | −2.50 | −2.00 | −1.80 | −1.60 |

The obtained photochemical electrode is immersed in a Na$_2$SO$_4$ 0.5 mol aqueous solution, an end portion thereof is connected to a metal wire, a platinum plate is placed as a counter electrode, and an external power supply and a current measurement unit (potentiostat) were placed between both electrodes. A surface of the photochemical electrode is irradiated with artificial sunlight at 1 SUN 100 mA/cm$^2$. The current at this moment is measured. As a result, 1.0 mA/cm$^2$ is obtained at a bias voltage of 1 V.

For example, glass provided with an FTO (fluorine-doped tin oxide) thin film may be used as a second example. The GaN (60)-ZnO (40) solid solution is sprayed on the FTO thin film by an aerosol-type nanoparticle deposition (NPD) process, whereby a thin film with an average thickness of 1 µm is formed. Subsequently, annealing is performed at 600° C. for 30 minutes in a nitrogen atmosphere. As above, a photochemical electrode is obtained. The aerosol-type nanoparticle deposition (NPD) process may be the same as the above-mentioned aerosol-type nanoparticle deposition (NPD) process.

The obtained photochemical electrode, as well as the first example, is measured for photocurrent. As a result, 0.3 mA/cm$^2$ is obtained at a bias voltage of 1 V.

For example, glass provided with an Fro (fluorine-doped tin oxide) thin film may be used as a third example. The ZnO (100) powder is sprayed on the FTO thin film by an aerosol-type nanoparticle deposition (NPD) process, whereby a thin film with an average thickness of 1 µm is formed. Subsequently, annealing is performed at 600'C for 30 minutes in a nitrogen atmosphere. As above, a photonanoparticle deposition (NPD) process, whereby a thin film (third layer) with an average thickness of 1 µm is formed. The GaN (40)-ZnO (60) solid solution is sprayed on the formed thin film (third layer) by the aerosol-type nanoparticle deposition (NPD) process, whereby a thin film (fourth layer) with an average thickness of 1 µm is formed. The GaN (50)-ZnO (50) solid solution is sprayed on the formed thin film (fourth layer) by the aerosol-type nanoparticle deposition (NPD) process, whereby a thin film (fifth layer) with an average thickness of 1 µm is formed. The GaN (60)-ZnO (40) solid solution is sprayed on the formed thin film (fifth layer) by the aerosol-type nanoparticle deposition (NPD) process, whereby a thin film (sixth layer) with an average thickness of 1 µm is formed. Annealing is performed at 600° C. for 30 minutes in a nitrogen atmosphere. As above, a photochemical electrode is obtained. The aerosol-type nanoparticle deposition (NPD) process may be the same as the above-mentioned aerosol-type nanoparticle deposition (NPD) process.

The configuration of a photoexcitation material layer in the obtained photochemical electrode, the potential of the CBM of each layer of the photoexcitation material layer, and the potential of the VBM thereof are indicated in Table 3.

TABLE 3

| Photoexcitation material | First layer ZnO (100) | Second layer GaN(20)-ZnO (80) solid solution | Third layer GaN (30)-ZnO (70) solid solution | Fourth layer GaN (40)-ZnO (60) solid solution | Fifth layer GaN (50)-ZnO (50) solid solution | Sixth layer GaN (60)-ZnO (40) solid solution |
|---|---|---|---|---|---|---|
| CBM (eV) | 0.10 | 0.12 | 0.15 | 0.20 | 0.25 | 0.30 |
| VBM (eV) | −3.50 | −2.50 | −2.30 | −2.00 | −1.80 | −1.60 |

The obtained photochemical electrode, as well as the first example, is measured for photocurrent. As a result, 1.0 mA/cm$^2$ is obtained at a bias voltage of 1 V.

For example, glass provided with an FTO (fluorine-doped tin oxide) thin film is used as a fifth example. The GaN (60)-ZnO (40) solid solution is sprayed on the Fro thin film by an aerosol-type nanoparticle deposition (NPD) process, whereby a thin film (first layer) with an average thickness of 1 μm is formed. The GaN (50)-ZnO (50) solid solution is sprayed on the formed thin film (first layer) by the aerosol-type nanoparticle deposition (NPD) process, whereby a thin film (second layer) with an average thickness of 1 μm is formed. The GaN (40)-ZnO (60) solid solution is sprayed on the formed thin film (second layer) by the aerosol-type nanoparticle deposition (NPD) process, whereby a thin film (third layer) with an average thickness of 1 μm is formed. The GaN (30)-ZnO (70) solid solution is sprayed on the formed thin film (third layer) by the aerosol-type nanoparticle deposition (NPD) process, whereby a thin film (fourth layer) with an average thickness of 1 μm is formed. The GaN (20)-ZnO (80) solid solution is sprayed on the formed thin film (fourth layer) by the aerosol-type nanoparticle deposition (NPD) process, whereby a thin film (fifth layer) with an average thickness of 1 μm is formed. The ZnO (100) powder is sprayed on the formed thin film (fifth layer) by the aerosol-type nanoparticle deposition (NPD) process, whereby a thin film (sixth layer) with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the above-mentioned aerosol-type nanoparticle deposition (NPD) process.

The configuration of a photoexcitation material layer in the obtained photochemical electrode, the potential of the CBM of each layer of the photoexcitation material layer, and the potential of the VBM thereof are indicated in Table 4.

TABLE 4

| Photoexcitation material | First layer GaN (60)-ZnO (40) solid solution | Second layer GaN (50)-ZnO (50) solid solution | Third layer GaN (40)-ZnO (60) solid solution | Fourth layer GaN (30)-ZnO (70) solid solution | Fifth layer GaN (20)-ZnO (80) solid solution | Sixth layer ZnO (100) |
|---|---|---|---|---|---|---|
| CBM (eV) | 0.30 | 0.25 | 0.20 | 0.15 | 0.12 | 0.10 |
| VBM (eV) | 1.60 | 1.80 | 2.00 | 2.30 | 2.50 | 3.50 |

The obtained photochemical electrode, as well as the first example, is measured for photocurrent. As a result, 0.0005 mA/cm$^2$ is obtained at a bias voltage of 1 V.

For example, glass provided with an FTO (fluorine-doped tin oxide) thin film is used as a sixth example. The WO$_3$ (100) powder is sprayed on the FTO thin film by an aerosol-type nanoparticle deposition (NPD) process, whereby a thin film (first layer) with an average thickness of 1 μm is formed. The GaN (20)-ZnO (80) solid solution is sprayed on the formed thin film (first layer) by the aerosol-type nanoparticle deposition (NPD) process, whereby a thin film (second layer) with an average thickness of 1 μm is formed. The GaN (40)-ZnO (60) solid solution is sprayed on the formed thin film (second layer) by the aerosol-type nanoparticle deposition (NPD) process, whereby a thin film (third layer) with an average thickness of 1 μm is formed. The GaN (50)-ZnO (50) solid solution is sprayed on the formed thin film (third layer) by the aerosol-type nanoparticle deposition (NPD) process, whereby a thin film (fourth layer) with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the above-mentioned aerosol-type nanoparticle deposition (NPD) process.

The configuration of a photoexcitation material layer in the obtained photochemical electrode, the potential of the CBM of each layer of the photoexcitation material layer, and the potential of the VBM thereof are indicated in Table 5.

TABLE 5

| Photoexcitation material | First layer WO$_3$ (100) | Second layer GaN (20)-ZnO (80) solid solution | Third layer GaN (40)-ZnO (60) solid solution | Fourth layer GaN (50)-ZnO (50) solid solution |
|---|---|---|---|---|
| CBM (eV) | −0.20 | 0.12 | 0.20 | 0.25 |
| VBM (eV) | −3.00 | −2.50 | −2.00 | −1.80 |

The obtained photochemical electrode, as well as the first example, is measured for photocurrent. As a result, 1.2 mA/cm$^2$ is obtained at a bias voltage of 1 V.

For example, glass provided with an FTO (fluorine-doped tin oxide) thin film is used as a seventh example. The WO$_3$ (100) powder is sprayed on the FTO thin film by an aerosol-type nanoparticle deposition (NPD) process, whereby a thin film with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the aerosol-type nanoparticle deposition (NPD) process for the first example.

The obtained photochemical electrode, as well as the first example, is measured for photocurrent. As a result, 0.001 mA/cm$^2$ is obtained at a bias voltage of 1 V.

For example, glass provided with an FTO (fluorine-doped tin oxide) thin film is used as an eighth example. The TiO$_2$ (100) powder is sprayed on the FTO thin film by an aerosol-type nanoparticle deposition (NPD) process, whereby a thin film (first layer) with an average thickness of 1 μm is formed. The GaN (50)-ZnO (50) solid solution is sprayed on the formed thin film (first layer) by the aerosol-type nanoparticle deposition (NPD) process, whereby a thin film (second layer) with an average thickness of 1 μm is formed. The GaN (60)-ZnO (40) solid solution is sprayed on the formed thin film (second layer) by the aerosol-type nanoparticle deposition (NPD) process, whereby a thin film (third layer) with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the aerosol-type nanoparticle deposition (NPD) process for the first example.

The configuration of a photoexcitation material layer in the obtained photochemical electrode, the potential of the CBM of each layer of the photoexcitation material layer, and the potential of the VBM thereof are indicated in Table 6.

TABLE 6

| Photoexcitation material | First layer TiO$_2$ (100) | Second layer GaN (50)-ZnO (50) solid solution | Third layer GaN (60)-ZnO (40) solid solution |
|---|---|---|---|
| CBM (eV) | 0.20 | 0.25 | 0.30 |
| VBM (eV) | −3.00 | −1.80 | −1.60 |

The obtained photochemical electrode, as well as the first example, is measured for photocurrent. As a result, 0.8 mA/cm$^2$ is obtained at a bias voltage of 1 V.

For example, glass provided with an FTO (fluorine-doped tin oxide) thin film is used as a ninth example. The SrTiO$_3$ (100) powder is sprayed on the FTO thin film by an aerosol-type nanoparticle deposition (NPD) process, whereby a thin film (first layer) with an average thickness of 1 μm is formed. The GaN (60)-ZnO (40) solid solution is sprayed on the formed thin film (first layer) by the aerosol-type nanoparticle deposition (NPD) process, whereby a thin film (second layer) with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the aerosol-type nanoparticle deposition (NPD) process for the first example.

The configuration of a photoexcitation material layer in the obtained photochemical electrode, the potential of the CBM of each layer of the photoexcitation material layer, and the potential of the VBM thereof are indicated in Table 7.

TABLE 7

| Photoexcitation material | First layer SrTiO$_3$ (100) | Second layer GaN (60)-ZnO (40) solid solution |
|---|---|---|
| CBM (eV) | 0.29 | 0.30 |
| VBM (eV) | −3.20 | −1.60 |

The obtained photochemical electrode, as well as the first example, is measured for photocurrent. As a result, 0.6 mA/cm$^2$ is obtained at a bias voltage of 1 V.

For example, glass provided with an FTO (fluorine-doped tin oxide) thin film is used as a tenth example. The GaN (60)-ZnO (40) solid solution is sprayed on the FTO thin film by an aerosol-type nanoparticle deposition (NPD) process, whereby a thin film (first layer) with an average thickness of 1 μm is formed. The SrTiO$_3$ (100) powder is sprayed on the formed thin film (first layer) by the aerosol-type nanoparticle deposition (NPD) process, whereby a thin film (second layer) with an average thickness of 1 μm is formed. Subsequently, annealing is performed at 600° C. for 30 minutes in a nitrogen atmosphere. As above, a photochemical electrode is obtained. The aerosol-type nanoparticle deposition (NPD) process may be the same as the aerosol-type nanoparticle deposition (NPD) process for the first example.

The configuration of a photoexcitation material layer in the obtained photochemical electrode, the potential of the CBM of each layer of the photoexcitation material layer, and the potential of the VBM thereof are indicated in Table 8.

TABLE 8

| Photoexcitation material | First layer GaN (60)-ZnO (40) solid solution | Second layer SrTiO$_3$ (100) |
|---|---|---|
| CBM (eV) | 0.30 | 0.29 |
| VBM (eV) | −1.60 | −3.20 |

The obtained photochemical electrode, as well as the first example, is measured for photocurrent. As a result, 0.0002 mA/cm$^2$ is obtained at a bias voltage of 1 V.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for producing a photochemical electrode, comprising:
   preparing an electrically conductive layer including a metal or a metal oxide;
   forming a first layer by spraying a powder of a first photoexcitation material over the electrically conductive layer;
   forming, over the first layer, a second layer by spraying a first solid solution including the first photoexcitation material and a second photoexcitation material which is different from the first photoexcitation material and a first ratio which is a ratio between the first photoexcitation material and the first photoexcitation material;
   forming, over the second layer, a third layer by spraying a second solid solution including the first photoexcitation material and the second photoexcitation material and a second ratio which is a ratio between the first photoexcitation material and the first photoexcitation material and is different from the first ratio;
   forming, over the third layer, a fourth layer by spraying a third solid solution including the first photoexcitation material and the second photoexcitation material and a third ratio which is a ratio between the first photoexcitation material and the first photoexcitation material and is different from the first ratio and the second ratio;
   forming, over the fourth layer, a fifth layer by spraying a fourth solid solution including the first photoexcitation material and the second photoexcitation material and a fourth ratio which is a ratio between the first photoexcitation material and the first photoexcitation material and is different from the first ratio, the second ratio and the third ratio; and
   annealing a laminated layer including the first layer, and the second layer, the third layer, the fourth layer and the fifth layer at a specific temperature in a specific atmosphere.

2. The method for producing the photochemical electrode according to claim 1, wherein the first photoexcitation material is GaN and the second photoexcitation material is ZnO.

3. The method for producing the photochemical electrode according to claim 1, wherein the spraying is performed by an aerosol-type nanoparticle deposition (NPD) process.

4. The method for producing the photochemical electrode according to claim 1, wherein the laminated layer is annealed at 600° C. temperature in a nitrogen atmosphere.

5. The method for producing the photochemical electrode according to claim 1, wherein the photochemical electrode includes a first photoexcitation material layer of the first photoexcitation material in which a potential of the conduction band minimum decreases from a second surface opposite to a first surface on the side of the electrically conductive layer toward the first surface or a second photoexcitation material layer of the second photoexcitation material in which a potential of the valence band maximum decreases from the second surface toward the first surface.

* * * * *